April 14, 1964

D. MEREDITH 3,129,071

PRODUCE TREATING APPARATUS AND METHOD

Filed April 25, 1962

INVENTOR.
DIVEN MEREDITH
BY
Edward C. Walsh
ATTORNEY.

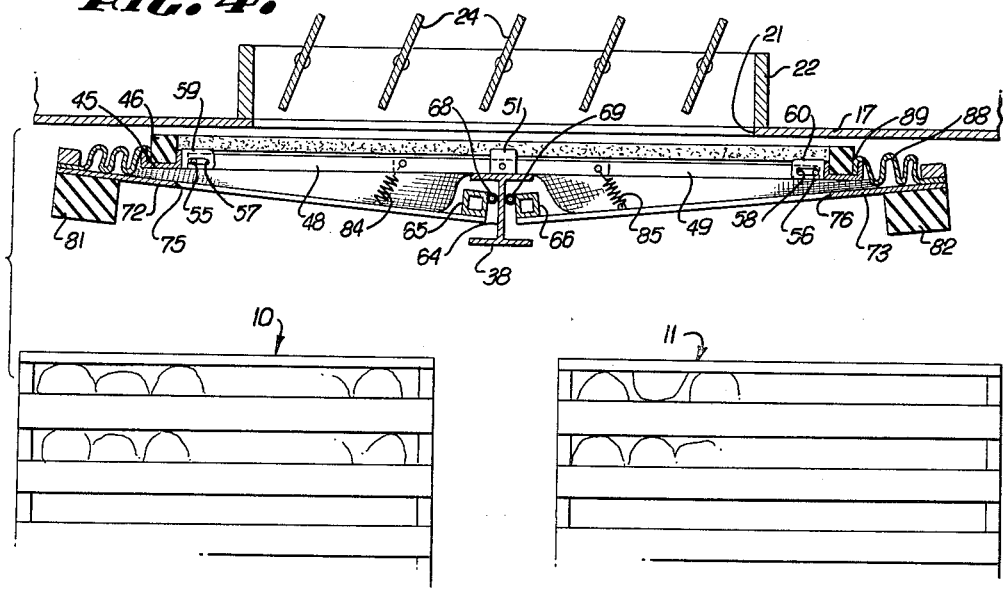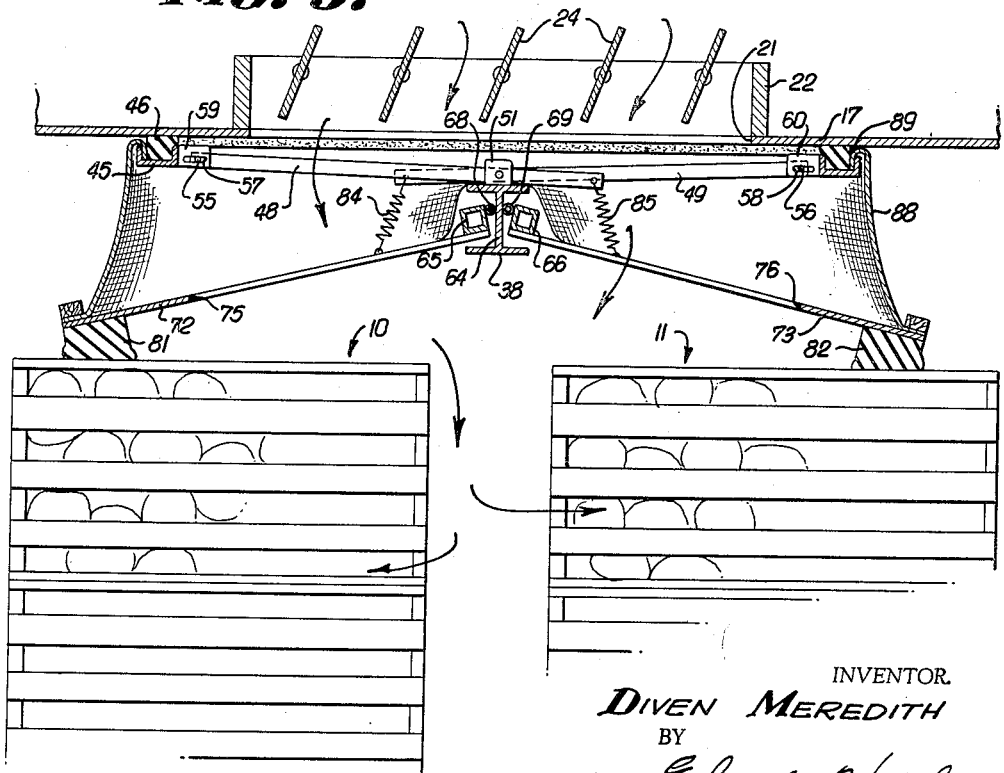

April 14, 1964　　　　　D. MEREDITH　　　　　3,129,071
PRODUCE TREATING APPARATUS AND METHOD
Filed April 25, 1962　　　　　　　　　　　　3 Sheets-Sheet 3
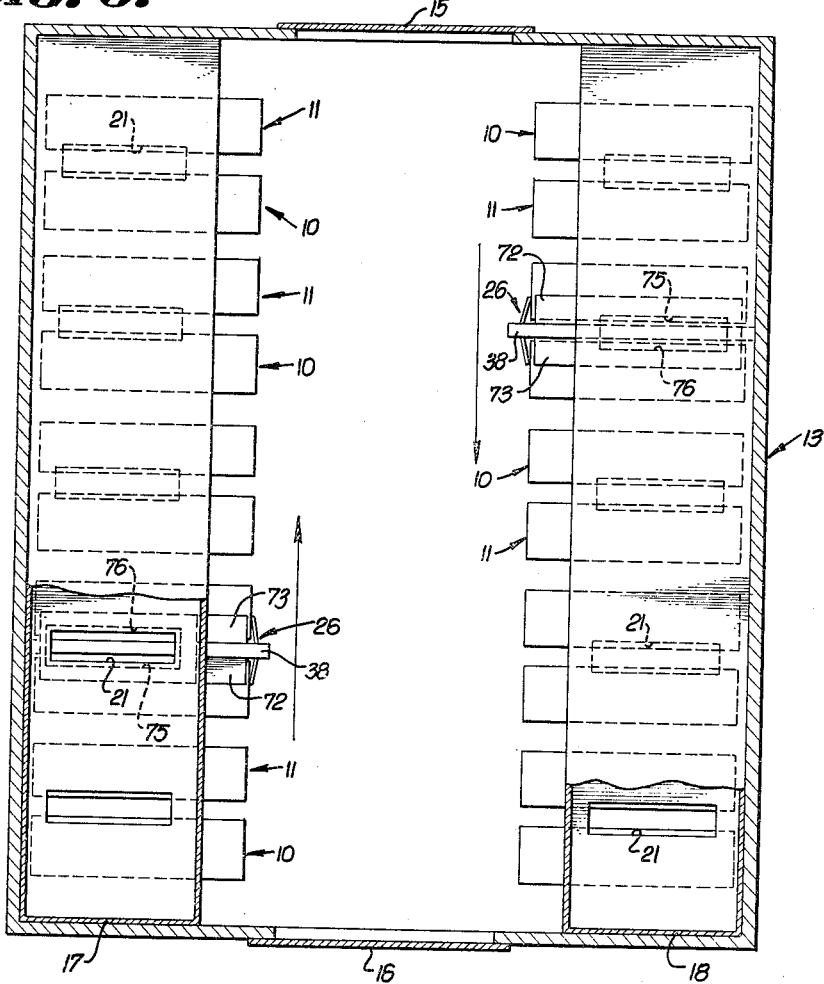
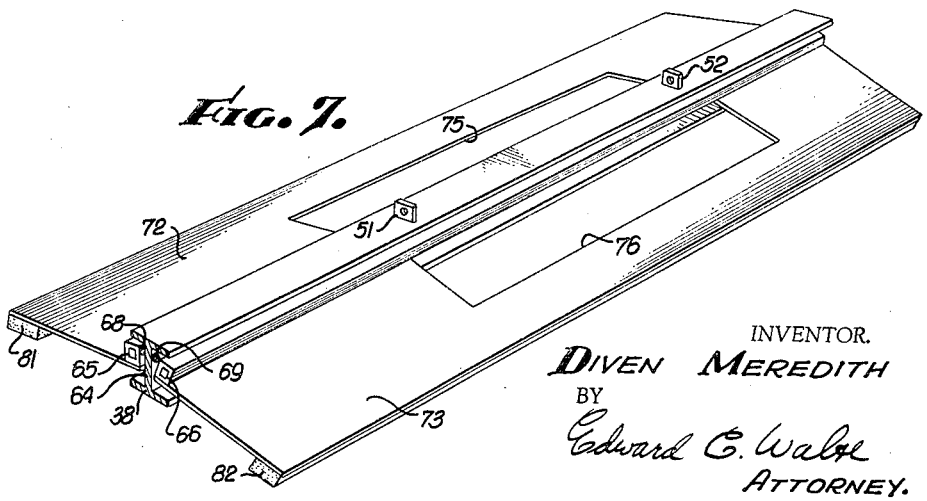
INVENTOR.
DIVEN MEREDITH
BY
Edward C. Walsh
ATTORNEY.

United States Patent Office 3,129,071
Patented Apr. 14, 1964

3,129,071
PRODUCE TREATING APPARATUS AND METHOD
Diven Meredith, 46—025 Arabia St., Indio, Calif.
Filed Apr. 25, 1962, Ser. No. 190,120
9 Claims. (Cl. 34—34)

This invention relates to a new concept, and improvements in the treating of produce and more particularly as exemplified herein, in the cooling or chilling of such produce as fruit. It is to be understood that the method and structure may be utilized for chilling, quick freezing, drying, dehydrating or other types of processing and that the disclosure herein relating to the cooling or chilling of fruit is illustrative and exemplary.

With respect to the handling of fruit, it is customary that when the fruit is picked the baskets, boxes or crates of the produce are moved into a cooling room or other enclosure for cooling or chilling. This invention relates primarily to a new concept in, and improvements in the handling of the produce in connection wtih the cooling or chilling thereof.

It is customary in the prior art to stack the boxes or crates of produce, one upon another, and it is also common to place the crates or boxes on pallets and then stack the pallets in stacks which are spaced with respect to each other. A common method of cooling or chilling the produce is by way of passing a flow of cooled or chilled air under pressure and at a substantial flow rate over the stacked crates or pallets. It has been the practice in the prior art to provide a cooling room into which the produce must be moved for purposes of cooling and then moved out again. Often the cooling room is in the form of a tunnel or tunnels and the produce must be moved into the tunnel or tunnels and then out again. This requires substantial handling of the produce and particular handling techniques. It has been the practice to move the produce on pallets by fork trucks into and out of the cooling room; or moving it in stacks by hand trucks; or by moving the containers on conveyors; or by stacking containers in the cooling room or tunnels by hand and removing them with hand trucks. The time, labor and expense in such handling of the produce is, of course, readily apparent. It may take an hour or more to load and unload a tunnel and the procedure is otherwise cumbersome and expensive.

The herein invention introduces a new concept which is that of providing in effect, cooling tunnels which are themselves movable and are moved to the pallets or stacks rather than the inverse operation of transporting the produce to and from the cooling tunnel or enclosure. A primary object of the invention is the introduction of this concept and the implementation thereof.

According to the invention, there is provided a movable enclosure means which in effect constitutes a tunnel which can be shifted from one stack or group of stacks of produce containers to another, and it may be set up at each position for flow of fluid treating medium, illustratively cold air, over the produce in that particular stack or stacks. Preferably the cooling medium is provided through an overhead conduit to which connections are made to the movable enclosure or tunnel.

Another object of the invention is to provide novel and improved means for implementing the foregoing concept by way of preferred forms of movable enclosures or tunnels and improved means for providing the flow passageways over the stacked produce.

In a preferred form of the invention, the movable tunnel or enclosure means is mounted on rollers or trolleys so that it can be readily moved from one station or position to another for cooling one or more stacks of produce at a time. Preferably also in a preferred form of the invention, it is constructed to provide for maximum simplicity, effectiveness and economy. To achieve these results it may be in the form of an upright or column movable on a roller or trolley wheel and a transverse member which comes into a position over and between adjacent stacks of containers or pallets. Supported from the upright column are adjustable shutter means for closing the passageway formed by the space between adjacent stacks, and supported by the transverse member are adjustable passageway forming means to provide a flow passageway for cooled air from an overhead conduit to the space between stacked containers.

Further objects lie in the particular construction or arrangements of the enclosure means, and especially the adjustable passageway forming means for providing the passageway from the air supply conduit to the stacked containers.

Many further objects and additional advantages of the invention will become apparent from the following detailed description and annexed drawings wherein:

FIGURE 4 is a cross-sectional view of the adjustable passageway forming means;

FIGURE 5 is a view like that of FIGURE 4 with the said means in extended position;

FIGURE 6 is a plan view of an exemplary cooling room adapted to the utilization of the herein invention;

FIGURE 7 is a perspective view showing the closure flaps of the adjustable passageway forming means.

Figure 1:
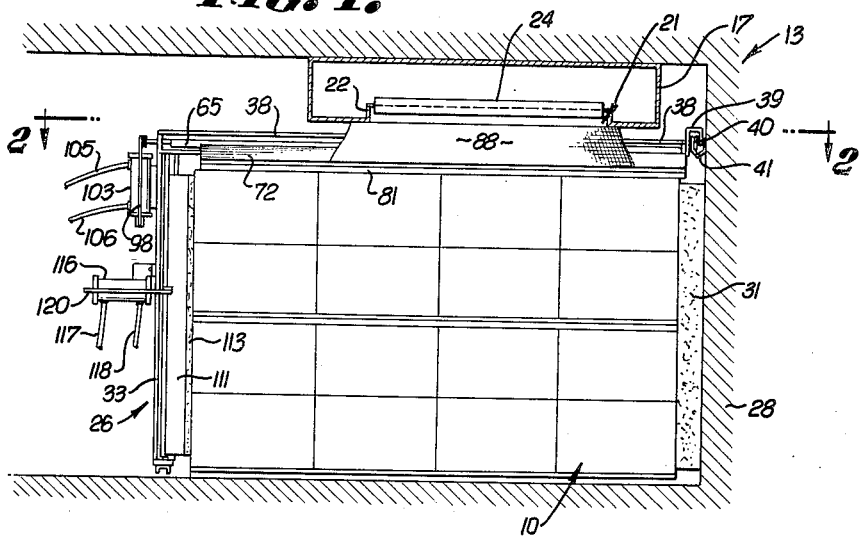
FIGURE 1 is a side view of a preferred form of the invention.
Figure 2:
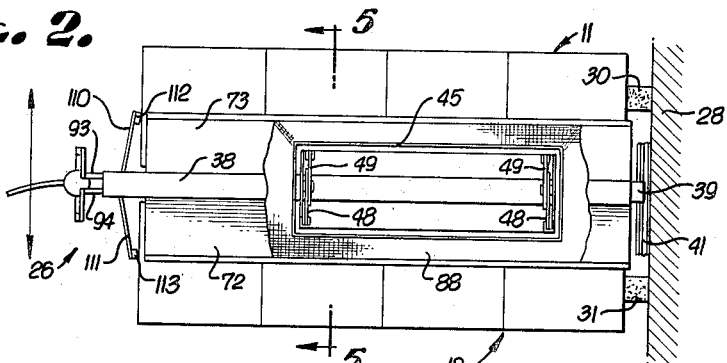
FIGURE 2 is a view taken along the line 2—2 of FIGURE 1.
Figure 3:
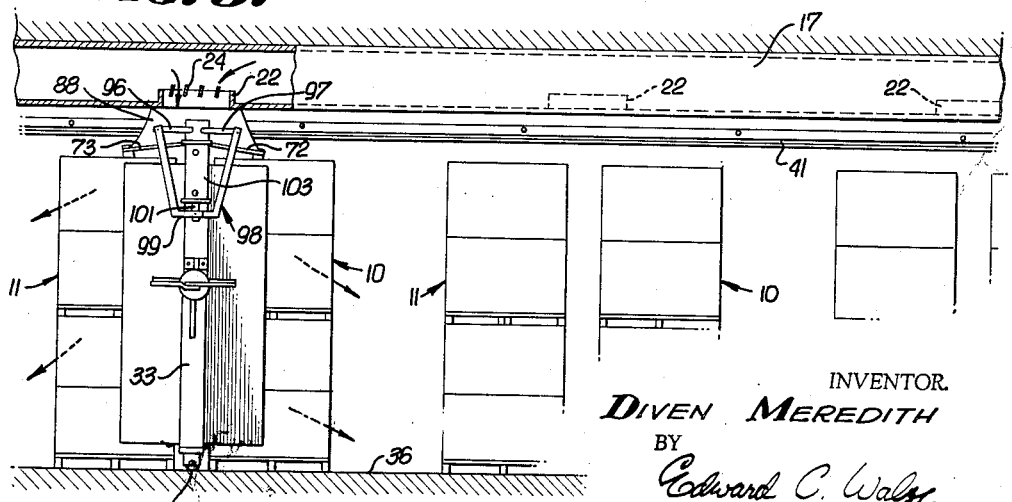
FIGURE 3 is an end view of the form of the invention shown in FIGURES 1 and 2.

Referring now more in detail to the drawings, FIGURES 1 and 2 and 3 show a preferred exemplary form of the movable cooling enclosure means or movable tunnel. This tunnel is movable from station to station and preferably at each position or station cooperates with two adjacent spaced stacks of containers or boxes, or pallets having containers stacked on them. Such stacks are designated at 10 and 11. As shown in FIGURE 6, these stacks may be arranged in a pattern as shown in that figure in a cooling room as designated at 13. The produce may be stacked therein in the manner shown just as it comes from the fields. Entrances and exits to the structure 13 are shown at 15 and 16. At the upper part of this structure there are provided conduits designated at 17 and 18 for the cooling medium which may be chilled air. The air is applied at a pressure and rate of flow as will be referred to more in detail hereinafter.

FIGURE 1 shows one of the conduits 17 which has openings in the bottom thereof as designated at 21, there being an upstanding skirt 22 around the opening. These openings are positioned over the spaces between adjacent stacks of containers or pallets. The movable enclosures or cooling tunnels are movable from position to position or station to station underneath the openings 21. As will be explained, the invention provides means for establishing a temporary passageway for flow of cooling medium from the openings 21 over the stacked containers of produce. The openings 21 are closed by manually actuatable dampers as designated at 24 in FIGURE 1.

The movable enclosure or cooling tunnel is designated generally at 26 in the figures. It moves relatively to the stacked containers. The containers are stacked adjacent to a fixed wall 28 of the structure 13 and preferably between each of the stacks of containers and the wall 28 there is provided a foam rubber sealing element as shown at 30 and 31 of the drawings so that the end of the space between the stacks is closed.

The movable enclosure or cooling tunnel comprises an upright or column 33 at the lower end of which is provided a roller or trolley wheel 35 movable along a fixed track 36. At the upper part of the upright or column 33 there is a transverse member 38 as shown in FIGURE 2. At the end of this member there is a bracket 39 as shown in FIGURE 1. Within this bracket there is a transverse axle on which is journalled another roller or trolley wheel 40 which rides on a track 41 provided on the side wall of the structure 13. The cooling tunnel may be moved by hand on its rails from one to another of its various positions.

Means are provided at the top or upper part of the cooling tunnel to form a passageway for the cooling air to flow from the conduit 17 to the space between the stacks and over the stacks of produce. The air can then flow outwardly through the stacks or through the pallets which ordinarily comprise upper and lower members with spacers between them.

Means are also provided on the movable enclosure means or cooling tunnel to close the other end of the passageway formed by the space between the stacks.

The passageway forming means at the top are shown in more detail in FIGURES 4, 5 and 7. As may be seen in these figures, the transverse member is shown as an I-beam although it could be a tubular member or column. The passageway or conduit forming means comprises a rectangular frame 45 which is channel shaped in cross-section. It is of a size to fit against the lower side of the conduit 17 around the opening 21 in it. Within the channel shaped formation of this member is a continuous peripheral sealing element 46 which may be made of rubber or the like.

The frame 45 is supported at each end by two pivoted support arms 48 and 49 which are pivoted to brackets 51 and 52 on top of the transverse member 38 as shown in FIGURE 7. The ends of these support arms extend beyond the pivot points as shown. The outer ends of these arms are attached by way of a sliding attachment comprising pins, as shown at 55 and 56 which slide in slots 57 and 58 in brackets 59 and 60 extending inwardly from the frame 45. The supporting arrangement is the same at each end.

The transverse member or column 38 has a central web 64. Pivoted or hinged to this web are a pair of square tubular elements 65 and 66 pivoted or attached by hinges as designated at 68 and 69. Attached respectively to the members 65 and 66 are flaps or wings 72 and 73 which may be made of plyboard or comparable material and which have openings through them as shown at 75 and 76. At the ends of the flaps 72 and 73 are sealing strips which are rectangular in cross-section, as shown at 81 and 82. These strips may be made of foam rubber or other suitable material adapted to seal directly against the tops of the stacks of containers as shown in FIGURE 5. The flaps 72 and 73 are attached to the extending end parts of the support arms 48 and 49 by coil springs 84 and 85, this assembly being the same at the opposite ends of the frame 45 and the flaps.

Attached to the frame member 45 all around its periphery is a flexible material such as canvas designated at 88, the peripheral edges being sealed between the sealing member 46 and the outside flange of the frame member 45 as shown at 89.

FIGURE 4 shows the position of the passageway forming means while the cooling tunnel is being moved. FIGURE 5 shows the position of the passageway forming means at any position or station in which a stack or stacks of products is to be cooled or chilled.

The adjustable or movable passageway forming means may be operated by mechanism such as shown in FIGURES 1 to 3. It may be operated by rotating the square tubular members 65 and 66 about their hinges. To accomplish this, these members have extending stems, as shown at 93 and 94 in FIGURE 2. Extending from the stems are links as designated at 96 and 97 in FIGURE 3. These links are attached to the legs of a yoke 98 and the bottom part or web 99 of this yoke is attached to the stem 101 of an operating cylinder 103. This cylinder may be a pneumatic or hydraulic cylinder having fluid connections thereto as shown at 105 and 106. When this cylinder is actuated its stem 101 operates the yoke 98 and through the links 96 and 97, the members 65 and 66 rotate about their hinges to move the flaps 72 and 73 between the positions shown in FIGURES 4 and 5. When the flaps are operated from the position of FIGURE 4 to that of FIGURE 5, the flaps move down, and through the springs 84 and 85 which provide a flexible connection, force is exerted on the extending ends of the support arms 48 and 49 so that the frame 45 is lifted and the seal 46 seals against the bottom of the conduit 17 around the opening 21. The flaps or wings 72 and 73 move down with the elements 81 and 82 sealing against the tops of the stacks as shown in FIGURE 5. Thus, the end parts of the flexible member or shroud 88 are drawn into positions as shown in FIGURE 5 to form a flexible conduit for passage of cooled air down through the opening 21, through the openings 75 and 76 in the flaps, and down into the passageway between the stacks and out through them as shown in FIGURES 3 and 5. The outer end of this passageway is closed at this time, as will be described presently. At the ends of the flaps 72 and 73 the flexible member or shroud 88 drapes down over the transverse beam 38 substantially closing the opening at the ends of the flaps 72 and 73, between them and the top surfaces of the top containers in the stacks.

The structure carried by the cooling tunnel for closing the end of the passageway formed between the stacks comprises a pair of shutters or flaps as designated at 110 and 111 in FIGURE 2, having sealing strips 112 and 113 at their ends similar to those on the flaps 72 and 73. The shutters 110 and 111 are hinged by means of piano hinges or the like to the upright column 33 so that these shutters swing about vertical axes. The seals 112 and 113 at the ends of these shutters seal against the ends of the stacked containers so as to substantially close the end of the passageway formed between the stacks. These shutters are operated by a pneumatic or hydraulic cylinder 116 similar to cylinder 103, having connections 117 and 118 to it. This cylinder has a stem connected to a yoke 120 similar to the yoke 98. The ends of the legs of the yoke are connected to the shutters 110 and 111 so that when the cylinder is operated the shutters are operated between their open and closed positions with respect to the stacks. These shutters and the passageway forming means at the top could be manually actuated, or by valve control means at the cooling tunnel or remotely.

From the foregoing, those skilled in the art will understand the construction of the movable cooling tunnel and the method of the invention. The cooling room is set up as shown in FIGURE 6. The produce or fruit is placed in it with containers stacked in the manner described underneath the conduits 17 and 18. The entire handling of the produce in transporting it into a cooling tunnel to be cooled and then transporting it out again is eliminated. The cooling is effected by simply moving the movable enclosure or cooling tunnel from one group of stacks to another as described. While the cooling tunnel is being moved its adjustable parts are in the position of FIGURE 4 so that the enclosure may be simply rolled along on its trolleys. The stacks are sealed against the wall at their inner ends as described in connection with FIGURE 1. At each station the cylinders 103 and 116 are operated. Operation of cylinder 103 moves the passageway forming means from the position of FIGURE 4 to that of FIGURE 5 providing an enclosed passageway for air from conduit 17 down through the flaps 72 and 73 and into the passageway between stacks as described in the foregoing. The operation of cylinder 116 closes the flaps or shutters 110 and 111 against the ends of the stacked containers. The result is that a substantially complete enclosure is formed so that the air can be forced down through the passageways formed and outwardly through the containers or pallets themselves. As soon as one stack or stacks of containers is appropriately cooled, the cylinders 103 and 116 are operated in the reverse manner and the movable enclosure or cooling tunnel is moved to the next station or position for a similar operation. In addition to the advantages already enumerated it will be apparent that the apparatus and method are highly adaptable to selecting any particular stack or stacks of containers to be cooled, and the cooling can be effected at any particular time merely by movement of the tunnel to the desired spot. In this manner very substantial savings in labor, handling and other economies are achieved.

The disclosure made herein is exemplary and illustrative of the concept and a preferred manner of implementation thereof. The invention may be utilized for many similar types of treatment, as mentioned in the foregoing. As known in the art, the fruit or other produce when brought in from the fields may be very hot and imposes a heavy cooling or chilling load. The herein invention is highly adaptable to meeting these needs and requirements. As known in the art, the reason for fast or rapid cooling is that by quickly taking out the field heat of the fruit there results a permanent preservation effect. The herein invention is highly adapted to realization of that purpose.

As stated, the disclosure is exemplary and it is to be understood that the air might be supplied to the tunnel at the side or end as well as the top. Furthermore, it is, of course, not imperative that the air or cooling medium be blown through under pressure, but it may be sucked through and in fact, it has been found to be more desirable to such it through than to blow it through. In the treatment of grapes, for example, air temperatures of 34° F. to 36° F. may be used with air pressures of 1½ to 2 inches of water which is approximately 2 to 5 pounds per square foot. This induces a relatively high velocity of several thousand feet per minute, for example, 2,000 feet per minute.

From the foregoing, those skilled in the art will readily observe that the invention achieves and realizes all of the objects and advantages that have been enumerated as well as having many additional advantages which are apparent from the detailed description. The disclosure is representative of a preferred form of the invention and is to be interpreted in an illustrative rather than a limiting sense, the invention to be accorded the full scope of the claims appended hereto.

What is claimed is:

1. In a treating apparatus, in combination, adjustable means for providing a fluid flow passageway between an opening in a fixed conduit and adjacent spaced stacks of containers or produce, said passageway means comprising a transverse member, a frame member having pivoted support arms pivoted to said transverse member and cooperable with the opening in said conduit, flap means pivoted to said transverse member and having means at their extremities engageable with the tops of adjacent stacks of containers, said flap means having passageways therethrough, and flexible enclosure material attached to said frame means around its periphery and attached to the extremities of said flap means whereby to provide a passageway from the opening in said conduit to the space between adjacent container stacks, means providing connections between said pivoted support arms and said flap means and means for simultaneously operating said arms and flap means whereby to provide engagement at the ends of said passageway means to provide for flow of treating medium therethrough.

2. Produce treating apparatus for treating produce in stacked containers with a fluid medium, comprising movable means for providing a temporary passageway for directing a flow of fluid treating medium over the produce, said movable means comprising at least one upright and a transverse member, a conduit for fluid treating medium having an opening in it adjacent to the stacked produce containers, said transverse member carrying adjustable fluid passageway forming means for forming a temporary substantially closed passageway directly between the opening in said conduit and a passageway formed by a space between adjacent stacks of produce containers, said adjustable passageway means comprising a closure frame movable to engage about the said opening in the said conduit, means for supporting said frame from said transverse member, movable closure means supported from said transverse member and engageable with adjacent stacks of produce containers, flexible passageway forming means attached to said closure frame and to said means engageable with the stacks of containers, and means for moving the supporting means for the closure frame and the said closure means whereby to move the closure frame towards the said conduit and the closure means towards the stacks of produce containers whereby to provide a passageway for fluid medium between the said conduit and the space between the stacked containers.

3. In combination, a movable flow directing means for directing a flow of fluid treating medium to be passed over at least one stack of containers of produce in a fixed location, a fixed conduit for fluid treating medium having an opening therein, said flow directing means having means to provide a passageway for fluid medium to pass over produce, said passageway means comprising an adjustable member movable to engage around the opening in said conduit means and connecting means to provide a passageway for fluid treating medium to be passed over the produce, said passageway forming means comprising means to move said member toward and away from the said conduit and the said connecting means comprising flexible passageway forming means extending from said member and providing a passageway for fluid treating medium between the said opening in the conduit and said containers, said passageway forming means additionally comprising at least one adjustable member engageable with and disengageable from at least one produce container to complete a passageway for treating medium between the opening in said conduit and produce containers.

4. In combination, a movable flow directing means for directing a flow of fluid treating medium to be passed over at least one stack of containers of produce, said containers being stacked in a fixed position adjacent to a fixed conduit for fluid treating medium having an opening therein, said movable flow directing means having means cooperable with the containers of produce whereby to provide a passageway for fluid treating medium to pass over said containers and which is in communication with said opening in said conduit, said movable flow directing means comprising a movable structure having parts movable into a position wherein said parts at least partially enclose a space between adjacent stacks of containers to provide a fluid medium passageway formed partly by the container stacks themselves, said closure means of said movable flow directing means comprising shutter members movable to directly engage the stacks of containers whereby to close the space between the stacks.

5. In combination, with a plurality of separate stacks of containers of produce to be treated at locations spaced apart from each other, a movable flow directing means for directing flow of fluid treating medium individually over a stack or stacks of containers, fixed conduit means for fluid treating medium, said flow directing means having means to provide at least a partial enclosure with respect to a separate stack of containers and a passageway for fluid medium to pass over said produce, the said stacks being not otherwise enclosed, the said conduit means having spaced openings therein, one at each of said locations, said flow directing means comprising means to engage around one of said openings in said conduit means to thereby complete a passageway for the fluid medium to be passed over the produce, and said flow directing means including means providing for movement between said spaced apart locations to perform the same service in association with others of said stacks and openings.

6. In combination, a movable flow directing means for directing a flow of fluid treating medium to be passed over at least one stack of containers of produce in a fixed location, a fixed conduit for fluid treating medium having an opening therein, said flow directing means having means to provide at least a partial enclosure with respect to the containers and a passageway for fluid medium to pass over said produce, said flow directing means comprising an adjustable member movable to engage around the opening in said conduit means and connecting means to provide a passageway for fluid treating medium to be passed over the produce, said flow directing means comprising means to move said member toward and away from the said conduit and said connecting means comprising flexible passageway forming means extending from said member and providing a passageway for fluid treating medium between said opening in the conduit and the containers.

7. Produce treating apparatus for treating produce in stacked containers with a fluid medium comprising movable means for providing at least a partial enclosure for the containers and a temporary passageway for directing a flow of fluid treating medium over the produce, said movable means comprising at least one upright and a transverse member, a fixed conduit for fluid treating medium having an opening in it adjacent to the stacked produce containers, said transverse member carrying adjustable fluid passageway forming means for forming a temporary substantially closed passageway directly between the opening in said conduit and a passageway formed by a space between adjacent stacks of produce containers, said upright member being provided with adjustable means for closing the end of the said passageway formed between adjacent stacks of containers, the other end of said passageway being closed by a fixed wall.

8. In the method of treating produce with a fluid medium, the steps of placing the produce in containers and stacking the containers in separate stacks in spaced apart location adjacent to separate openings in a fluid conditioning conduit and to provide a space between adjacent stacks, and so that said space is closed at least in part by the interior of a building, moving a portable flow directing means to a position with respect to individual groups of containers whereby to form at least a partial enclosure with respect to a group of containers and providing a passageway for flow of fluid medium over the said group of containers, and between said group of containers and one of said openings, and so that said space is closed at least in part by the interior of a building and is otherwise enclosed by said portable flow directing means, causing the said medium to pass both over the produce containers and through the said opening, and then moving the said portable flow directing means to another group of produce containers and conduit opening and similarly treating said group.

9. A method as in claim 8 including stacking the containers against a vertical wall so that the wall closes the said space between the stacks of containers at one end of said stacks.

References Cited in the file of this patent
UNITED STATES PATENTS

| | | |
|---|---|---|
| 1,833,034 | Parker | Nov. 24, 1931 |
| 2,139,500 | Hughes | Dec. 6, 1938 |
| 2,243,114 | Ness | May 27, 1941 |
| 2,439,487 | Reilly | Apr. 13, 1948 |
| 2,475,077 | Clancy | July 5, 1949 |
| 2,634,589 | Wilson | Apr. 14, 1953 |
| 2,821,029 | Simons | Jan. 28, 1958 |